United States Patent [19]
Gill et al.

[11] Patent Number: 5,894,385
[45] Date of Patent: Apr. 13, 1999

[54] HIGHLY SENSITIVE MAGNETORESISTIVE SENSOR WITH A SERIES FLUX GUIDE

[75] Inventors: Hardayal Singh Gill, Portola Valley; Douglas Johnson Werner, Fremont, both of Calif.

[73] Assignee: International Business Machines Corporation, Armonk, N.Y.

[21] Appl. No.: 08/896,516

[22] Filed: Jun. 24, 1997

Related U.S. Application Data

[63] Continuation of application No. 08/582,291, Jan. 3, 1996, abandoned.

[51] Int. Cl.$^6$ .................................................. G11B 5/39
[52] U.S. Cl. ........................................................ 360/113
[58] Field of Search ........................... 360/113; 338/32 R; 324/252

[56] References Cited

U.S. PATENT DOCUMENTS

| | | | |
|---|---|---|---|
| 4,291,351 | 9/1981 | Pennell et al. | 360/113 |
| 4,700,252 | 10/1987 | Muraoka et al. | 360/113 |
| 5,018,037 | 5/1991 | Krounbi et al. | 360/113 |
| 5,206,590 | 4/1993 | Dieny et al. | 324/252 |
| 5,241,439 | 8/1993 | Michalek et al. | 360/113 |
| 5,258,883 | 11/1993 | Ruigrok | 360/113 |
| 5,270,895 | 12/1993 | Ruigrok et al. | 360/126 |
| 5,287,238 | 2/1994 | Baumgart et al. | 360/113 |
| 5,291,363 | 3/1994 | Somers | 360/113 |
| 5,301,079 | 4/1994 | Cain et al. | 360/113 |
| 5,412,524 | 5/1995 | Nagata et al. | 360/113 |
| 5,424,890 | 6/1995 | Suyama et al. | 360/113 |
| 5,493,467 | 2/1996 | Cain et al. | 360/113 |
| 5,523,687 | 6/1996 | Mouchot et al. | 360/113 X |
| 5,546,254 | 8/1996 | Gill | 360/113 |
| 5,557,491 | 9/1996 | Gill et al. | 360/113 |
| 5,648,886 | 7/1997 | Kobayashi et al. | 360/113 |
| 5,696,656 | 12/1997 | Gill et al. | 360/113 |

*Primary Examiner*—William R. Korzuch
*Attorney, Agent, or Firm*—Paik Saber

[57] ABSTRACT

An orthogonal magnetoresistive (MR) read sensor is provided having an MR sensing element which is perpendicular to an air bearing surface (ABS) and has an easy axis which is parallel to the ABS. The MR sensor further has top and bottom flux guides in series with the bottom and the top portion of the MR sensing element, respectively. The bottom flux guide extends perpendicular from the ABS. Bottom and top leads are connected to the bottom and top flux guides, respectively, in a spaced-apart relationship for conducting a sense current through the MR sensing element. The MR sensing element and the bottom lead are electrically insulated from each other by an insulating layer which is placed between the sensing element and the bottom lead. Electrically insulating the sensing element from the bottom lead makes the sensing efficiency of the sensing element independent of the size of the bottom lead thus improving the performance and manufacturability of the orthogonal MR sensor.

9 Claims, 6 Drawing Sheets

HIGHLY SENSITIVE MAGNETORESISTIVE SENSOR WITH A SERIES FLUX GUIDE

This application is a continuation of application Ser. No. 08/582,291, filed on Jan. 3, 1996, now abandoned.

BACKGROUND OF THE INVENTION

1. Technical Field

This invention relates in general to a magnetoresistive read sensor for reading signals recorded in a magnetic medium and, more particularly, this invention relates to an improved orthogonal magnetoresistive read sensor with a series flux guide.

2. Description of the Background Art

A magnetoresistive (MR) read sensor (head) has been shown to be capable of reading data from a magnetic surface of a magnetic disk at great linear densities. An MR sensor detects magnetic fields through the resistance changes of its MR sensing element (also referred to as "MR layer" and/or "MR material") as a function of the strength and direction of the magnetic flux being sensed by the MR sensing element. MR read sensors are of great interest for several reasons: MR sensors' intrinsic noise is lower than inductive sensors' intrinsic noise, thus providing improved signal-to-noise (S/N) performance; MR sensors sense magnetic flux ($\phi$) as compared to inductive heads which sense the time rate of flux change, $d\phi/dt$, thus making the reproduction of the signal recorded on a medium independent of the relative velocity between the MR sensor and the medium; and MR sensors have bandwidth in the gigahertz (gHz) range which allows area storage density well in excess of one gigabit per square inch.

MR sensors currently being used or under development fall into two broad categories: 1) anisotropic magnetoresistive (AMR) sensors and 2) giant magnetoresistive (GMR) sensors. In the AMR sensors, the resistance of the MR layer varies as the function of $\cos^2\alpha$ where $\alpha$ is the angle between the magnetization and the direction of the sense current flowing in the MR layer. The MR layer is made of ferromagnetic material. U.S. Pat. No. 5,018,037 entitled "Magnetoresistive Read Transducer Having Hard Magnetic Bias", granted to Krounbi et al. on May 21, 1991, discloses an MR sensor operating on the basis of the AMR effect.

In the GMR sensor, the resistance of the MR sensing element varies as a function of the spin-dependent transmission of the conduction electrons between the magnetic layers separated by a non-magnetic layer and the accompanying spin-dependent scattering which takes place at the interface of the magnetic and non-magnetic layers and within the magnetic layers. The magnetic layers are made of ferromagnetic material. GMR sensors using only two layers of ferromagnetic material separated by a layer of non-magnetic metallic material are generally referred to as spin valve (SV) MR sensors. A GMR sensor fabricated from the appropriate materials provides improved sensitivity and greater change in resistance than observed in sensors using the AMR effect. U.S. Pat. No. 5,206,590 entitled "Magnetoresistive Sensor Based On The Spin Valve Effect", granted to Dieny et al. on Apr. 27, 1993, discloses an MR sensor operating on the basis of the spin valve effect.

MR sensors further fall into two configurations. In one configurations the sense current is conducted in the MR sensing element parallel to the air bearing surface. Air bearing surface (ABS) refers to the surface of the slider adjacent the magnetic disk surface. In the other configurations the sense current is conducted in the MR sensing element perpendicular to the air bearing surface. The former configuration is referred to as conventional MR read sensors and the latter configuration is known as orthogonal MR read sensors.

Figure 1:
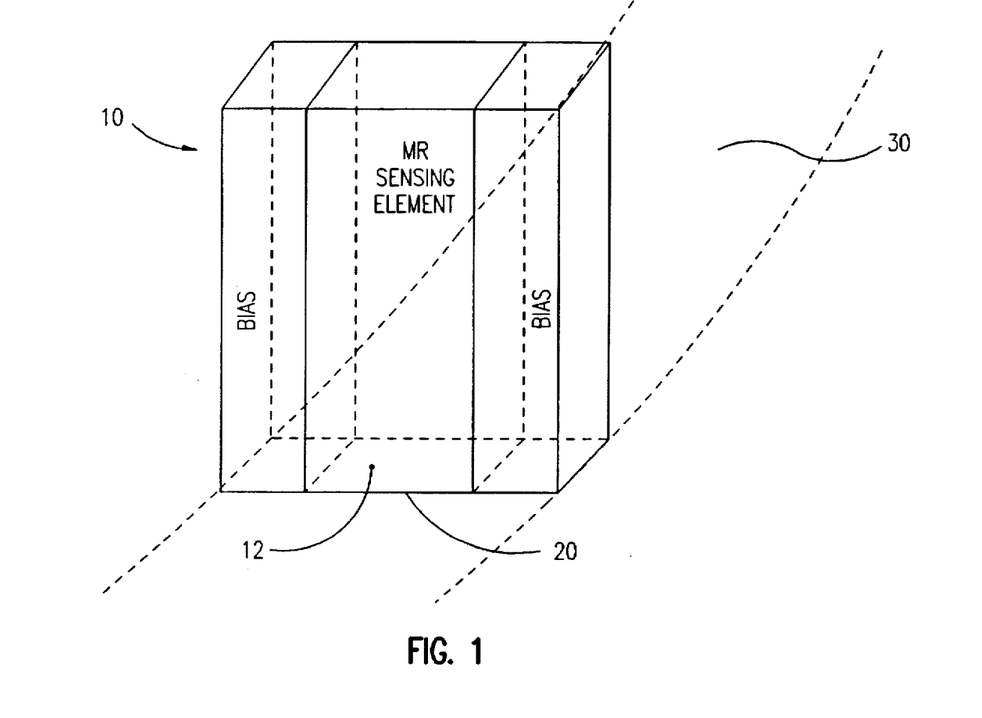
FIG. 1 is a perspective view of an orthogonal MR sensor in relationship to an information-carrying track on a magnetic disk.
Figure 2A:
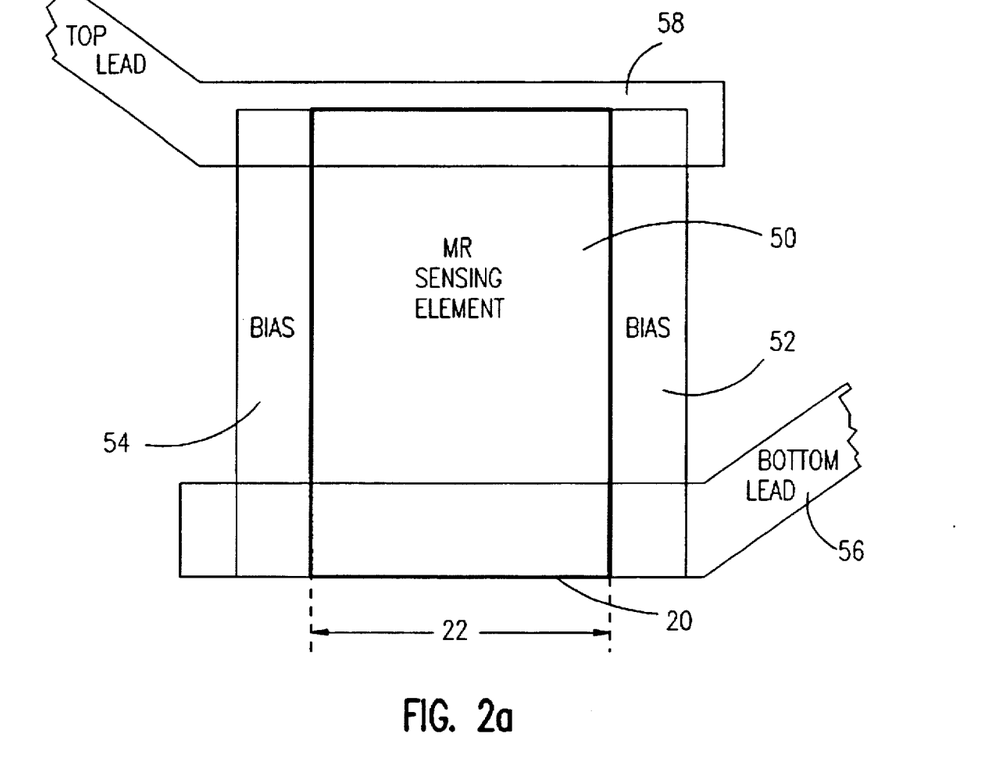
FIGS. 2A and 2B are a front view and an air bearing surface view of the orthogonal MR sensor shown in FIG. 1.
Figure 2B:
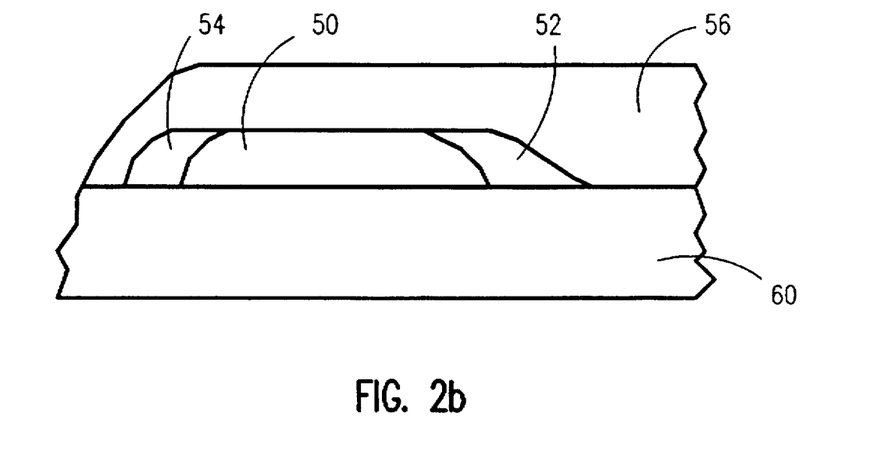

A perspective view of an orthogonal MR sensor 10 having a read surface 12 above a circular track 30 on a storage medium is shown in FIG. 1 Read surface 12 forms a part of the air bearing surface 20 FIGS. 2A and 2B also show a front view and an ABS view (the MR sensor as seen from the air bearing surface), respectively, of an orthogonal MR sensor 10 MR sensor 10 comprises MR sensing element 50 formed on a suitable substrate 60, biasing end regions 52 and 54 formed on substrate 60, bottom lead 56, and top lead 58. Each biasing end region forms a contiguous junction with sensing element 50. Bottom lead 56 is further in contact with the bottom portion of MR sensing element 50 and top lead 58 is connected to the top portion of sensing element 50. Width 22 of MR sensing element 50 is defined as the track width of the MR sensor. MR sensing element 50 has an easy axis which extends parallel to ABS 20.

The orthogonal MR sensor, as shown in FIG. 2A, has several advantages, namely: the amplitude of its read back signal can be made substantially independent of its track width 22 and the bottom portion of the MR sensor at the ABS can be electrically grounded together with the shields, thus eliminating problems arising from electrical shorts between the sensing element and the shields. However, the orthogonal MR sensor also has several disadvantages, namely: (1) it has a very poor read back sensitivity. This is due to the fact that sensing element sensitivity is seriously affected among other things, by the height of the bottom lead which is in contact with the MR sensing element and shunts current away from the sensing element. For example, if the height of a sensing element is about 1.0 micron with about ±0.5 micron variation in the height due to the statistical variations present in its manufacturing process and if the height of the bottom lead is about 0.4 micron with about ±0.2 micron variation in the height of the bottom lead, then in some of the sensors produced with this manufacturing process, virtually all the sensing current is shunted by the bottom lead severely degrading the sensed signal amplitude; (2) MR sensors, especially spin valve MR sensors, typically utilize materials such as copper (Cu), cobalt (Co) or nickel iron (NiFe) in order to form the layers of the sensing element. The presence of these materials at the head/disk interface can cause head failure due to head corrosion; (3) in near contact recording applications, the presence of the MR sensing element of an MR sensor at the head/disk interface can cause sensor failure due to mechanical and/or thermal phenomena; and, (4) it is critical to accurately control the size of the sensing element during the lapping process since the performance of MR sensors are dependent on the stripe height of their sensing element. However, mechanical lapping processes currently used to lap MR sensors have substantial manufacturing tolerances associated with them. As a result, it is extremely difficult to accurately control the stripe height of the MR sensors during the lapping process. This results in producing MR sensors with unpredictable sensing efficiency for sensing read back signals.

Therefore, there is a need for an invention which teaches how to substantially eliminate the aforementioned problems and at the same time improve the sensitivity and corrosion resistant of orthogonal MR sensors.

SUMMARY OF THE INVENTION

It is an object of the present invention to teach an orthogonal MR read sensor which overcomes the signal sensing sensitivity problem associated with prior art orthogonal MR read sensors.

It is another object of the present invention to disclose an orthogonal MR sensor where the lead at the air bearing surface does not shunt current away from the MR sensing element.

It is another object of the present invention to disclose an orthogonal MR sensor having a series flux guide.

It is yet another object of the present invention to disclose an orthogonal MR sensor where the sensitivity of the sensing element is independent of the manufacturing tolerances in the lapping process.

It is also another object of the present invention to disclose an orthogonal MR sensor which is corrosion resistant.

These and other objects and advantages are attained in accordance with the principles of the present invention by an orthogonal MR read sensor (AMR read sensor or GMR read sensor) having an MR sensing element in series with a flux guide where the MR sensing element is insulated from the bottom lead of the MR sensor by an insulator layer placed between the MR sensing element and the bottom lead. The placement of the insulator layer between the MR sensing element and the bottom lead eliminates a critical processing step of controlling the size and the placement of the bottom lead in relation to the sensing element thus substantially improving the sensing efficiency of orthogonal sensors. The placement of the insulator layer between the sensing element and the bottom lead will ensure that the bottom lead and the MR sensing element are not electrically in contact with each other and therefore the bottom lead does not shunt sense current away from the sensing element. The bottom lead is further in contact with the series flux guide where the series flux guide is placed between the sensing element and the air bearing surface. The series flux guide does not shunt the MR sensing element and therefore it does not degrade the sensing efficiency of the sensing element. The series flux guide is generally made of a magnetic material which is noncorrosive or less corrosive than the magnetic material used in forming the MR sensing element. The series flux guide eliminates the corrosion problem; eliminates mechanical and/or thermal problems in near contact recording; and eliminates the sensitivity of the MR sensor to the lapping process because what gets lapped during the lapping process is the flux guide as opposed to the MR sensing element.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings

BEST MODE FOR CARRYING OUT THE INVENTION

The following description is the best mode presently contemplated for carrying out the invention. This description and the number of alternative embodiments shown are made for the purpose of illustrating the general principle of the present invention and is not meant to limit the inventive concepts claimed herein.

Figure 3:
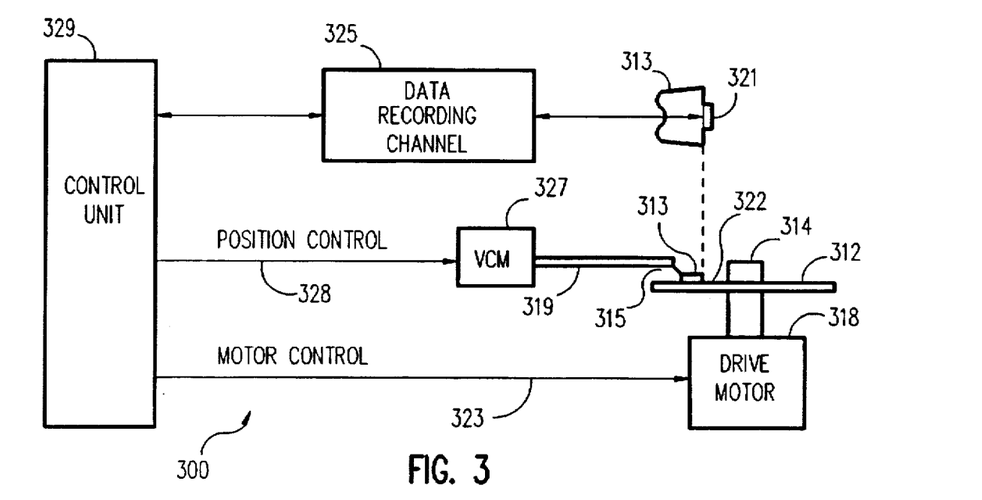
FIG. 3 is a simplified block diagram of a magnetic disk storage system embodying the present invention.

Referring now to FIG. 3, although the invention is described as embodied in a magnetic disk storage system 300 as shown in FIG. 3, it will be apparent that the invention is also applicable to other magnetic recording systems such as a magnetic tape recording system. As shown in FIG. 3, at least one rotatable magnetic disk 312 is supported on a spindle 314 and rotated by a disk drive motor 3183 The magnetic recording media on each disk is in the form of an annular pattern of concentric data tracks (not shown) on disk 312.

At least one slider 313 is positioned on the disk 312, each slider 313 supporting one or more magnetic read/write heads 321. As the disks rotate, slider 313 is moved radially in and out over disk surface 322 so that heads 321 may access different portions of the disk where desired data is recorded. Each slider 313 is attached to an actuator arm 319 by means of a suspension 315. The suspension 315 provides a slight spring force which biases slider 313 against disk surface 322. Each actuator arm 319 is attached to an actuator means 3271 The actuator means as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by means of recording channel 325.

The above description of a typical magnetic disk storage systems and the accompanying illustration of FIG. 3 are for representation purposes only. It should be apparent that disk storage systems may contain a large number of disks and actuators, and each actuator may support a number of sliders.

Figure 4A:
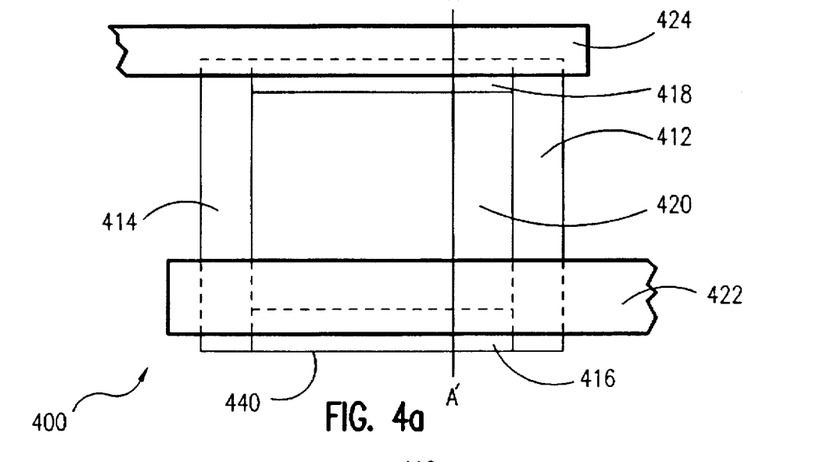
FIGS. 4A, 4B, and 4C are a front view, an air bearing surface view, and a cross section view, respectively, of the orthogonal MR sensor of the present invention after the formation of the bottom and top leads.
Figure 4B:
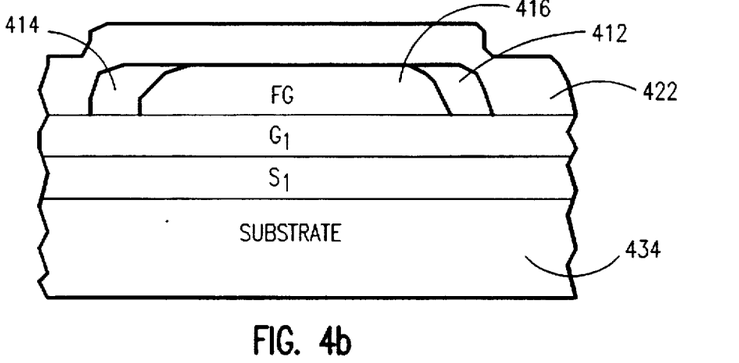
Figure 4C:
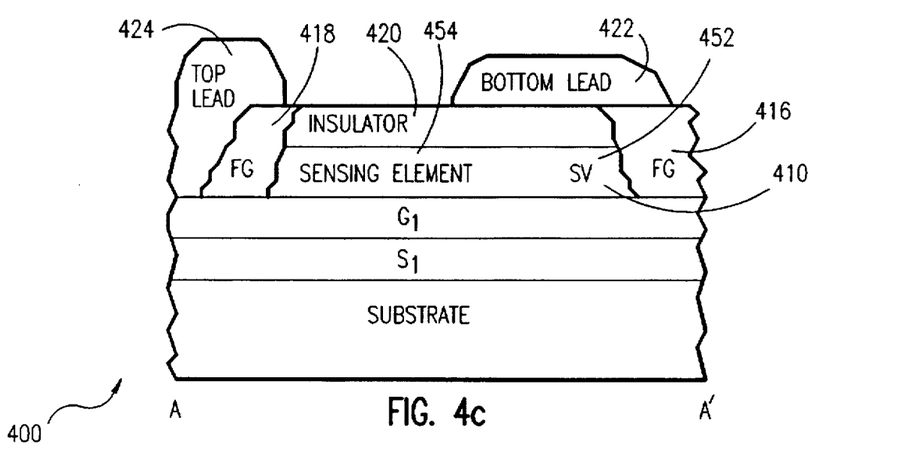

Now referring to FIGS. 4A, 4B and 4C, there is shown a front view, an air bearing surface view, and a cross-section view along the line AA' of orthogonal MR sensor 400 of the preferred embodiment of the present invention after the placement of the top and bottom leads MR sensor 400 comprises an MR sensing element 410 (shown in FIG. 4C) made of spin valve material where the MR sensing element has a bottom portion 452 and a top portion 454. MR sensing element 410 is formed over a first gap layer G1 where the first gap layer is formed over a first shield layer S1. The first shield layer is formed over a suitable substrate 434. MR sensor 400 further comprises end regions 412 and 414, each end region comprises a longitudinal biasing material for longitudinally biasing the sensing element. Each end region further forms a contiguous junction with sensing element 410. MR sensor 400 further comprises an air bearing surface (ABS) 440 and a bottom flux guide 416 in series with the bottom portion of sensing element 410 and a top flux guide 418 in series with the top portion of sensing element 410. The bottom flux guide extends perpendicular to ABS 440. MR sensor 400 further comprises a bottom lead 422 and a top lead 424 connected to flux guides 416 and 424 in a spaced apart relationship respectively. The bottom and the top leads are used for conducting a sense current through the MR sensing element perpendicular to the ABS. In the preferred embodiment of the present invention, MR sensor 400 further comprises an insulating layer 420 placed between sensing element 410 and bottom lead 422 to prevent electrical contact between the MR sensing element and the bottom lead. The addition of insulating layer 420 ensures that the size of the bottom lead, large or small, will have no effect on the signal sensing efficiency of sensing element 410. In other words insulating layer 420 does not allow bottom lead 422 to shunt sense current away from sensing element 410. The addition of this insulating layer substantially improves the overall manufacturing yield of the orthogonal MR sensor of the present invention because the size of the bottom lead and the accuracy of its placement with respect to the sensing element are no longer critical steps in the manufacturing process.

Figures 5A, 5B:
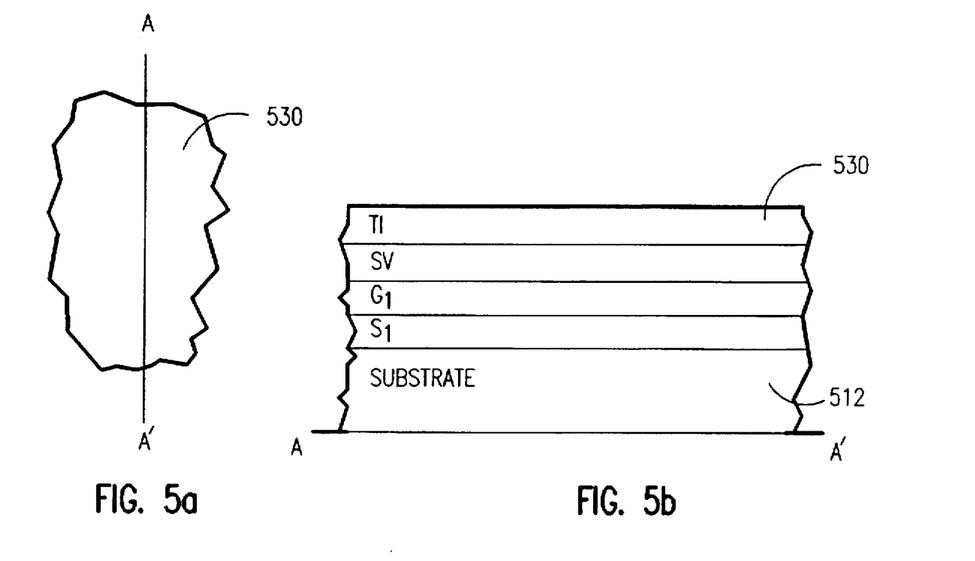
FIGS. 5A–5K show the specific steps of a process for fabricating the orthogonal MR sensor of the present invention having an insulator between the sensing element and the bottom lead and a flux guide in series with the sensing element.
Figure 5C:
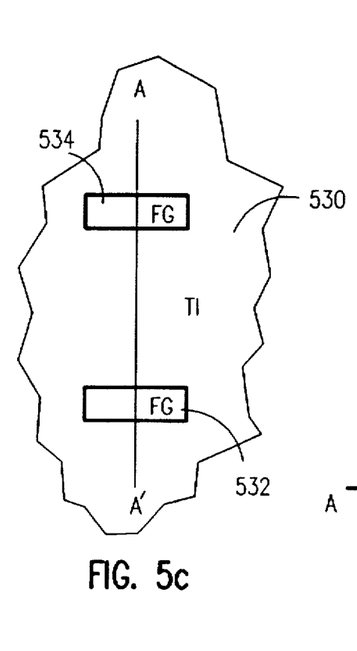
Figure 5D:
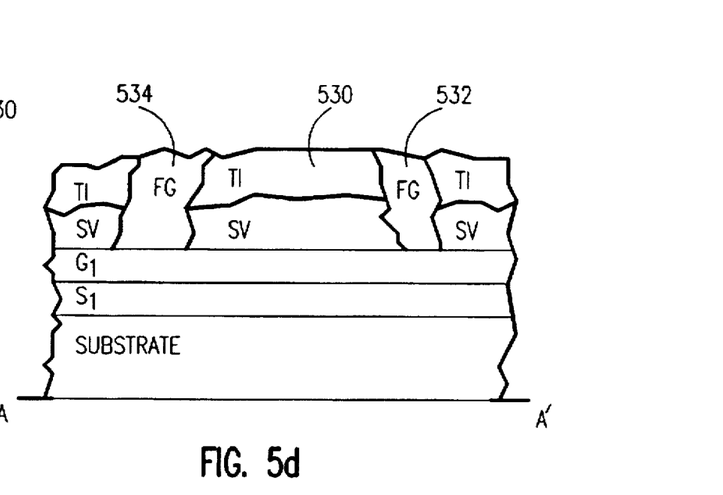

Furthermore, since the size of the bottom lead has no effect on the signal sensing efficiency of the sensing element, bottom lead 422 can be made relatively large. A large bottom lead simplifies the manufacturing step of connecting the bottom lead to a second shield layer S2 (opening 560 as shown in FIGS. 5J and 5K). A connection between second shield layer S2 and bottom lead 422 ensures that S2 layer, bottom lead 422e and sensing element 410 are all at the same electrical potential thus eliminating the problems arising from electrical shorting between the sensing element and the shields With reference to FIGS. 5A–5K, there is shown an example of the preferred method of manufacturing the orthogonal spin valve MR sensor of the present invention having an insulator layer (referred to as "top insulator" (TI)) placed between the MR sensing element and the bottom lead and further having a flux guide in series with the MR sensing element. It is to be noted that the process steps for depositing a first shield S1 over a suitable substrate 512, depositing a first read gap G1 ever S1, and depositing a spin valve MR material SV over G1 will be omitted because they are known in the art. FIGS. 5A and 5B show the top view and the side view along the line AA', respectively, of a process step after the deposition of top insulator (TI) 530 over the spin valve MR sensor material.

After depositing the top insulators photoresist material is deposited over the top insulators patterned to define the regions for forming the bottom and the top flux guides followed by developing photoresist and removing the top insulator and sensor materials in the areas that photoresist have been developed and dissolved. The top insulator and the sensor material are then removed by, for examples ion beam milling or sputter etching. A permeable material such as NiFe or a nickel iron alloy is then deposited to form the bottom and top flux guides. The remaining photoresist is then dissolved with the flux guide above the photoresist being removed or "lifted off", leaving flux guide only in the predefined regions. FIGS. 5C and 5D show the top view and the cross-section view along the line AA', respectively, at the completion of the above process step.

Next, stabilizing regions (also referred to as passive end regions) 540 and 542 are formed where each stabilizing region comprises a biasing material 546 and insulating material 548. Each stabilizing region forms a contiguous junction with the MR sensing element. Materials such as NiFe/NiMn or CoPtCr are typically used to provide longitudinal biasing of the MR sensing element and the flux guides by exchange or magnetostatic coupling. Materials such as $SiO_2$ or $Al_2O_3$ is generally used to provide insulation. In order to form stabilizing areas 540 and 542e photoresist material is deposited over surface 530, patterned to define the areas 540 and 542 followed by developing the photoresist and removing the top insulator and sensor materials in the areas that photoresist have been developed. The top insulator and the sensor material are removed by, for examples ion beam milling or sputter etching. Next, biasing material and insulating material are deposited to form areas 540 and 542. The remaining photoresist is then dissolved with the bias and insulating material above the photoresist being removed or "lifted off", leaving bias and insulating materials only in the predefined regions.

Figure 5E:
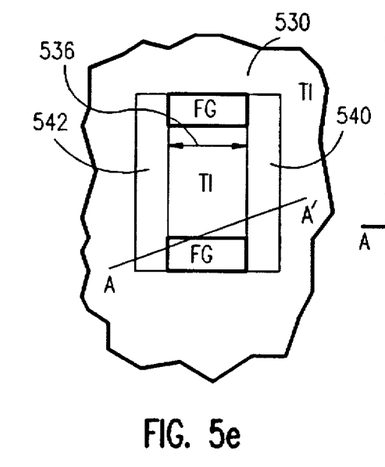
Figure 5F:
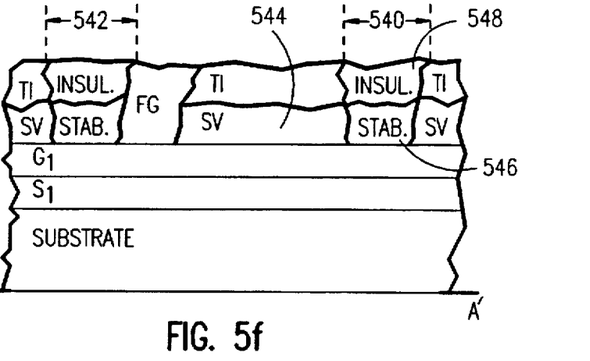

FIGS. 5E and 5F show a top view and an angled cross section along the line AA', respectively at the completion of the above process step after the formation of stabilizing areas 540 and 542. Note that the formation of areas 540 and 542 also defines track width 536 of the MR sensing element. Also note that flux guides 532 and 534 and stabilizing areas 540 and 542 together define the height and the width of MR sensing element 544.

Figure 5G:
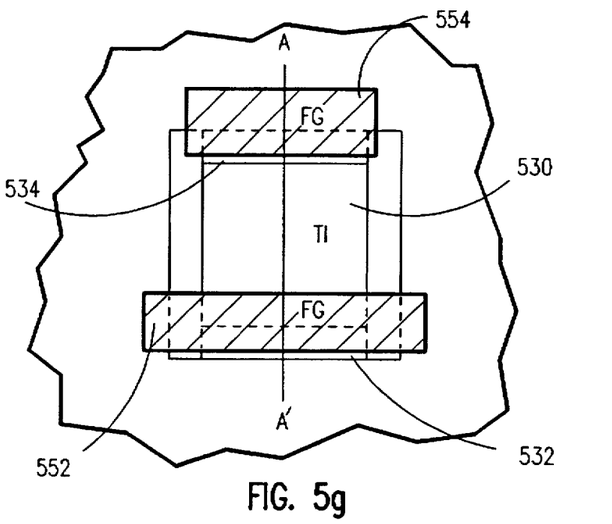
Figure 5H:
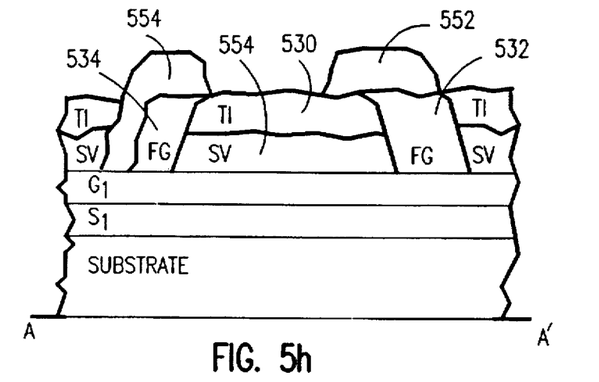
Figures 5I, 5J:
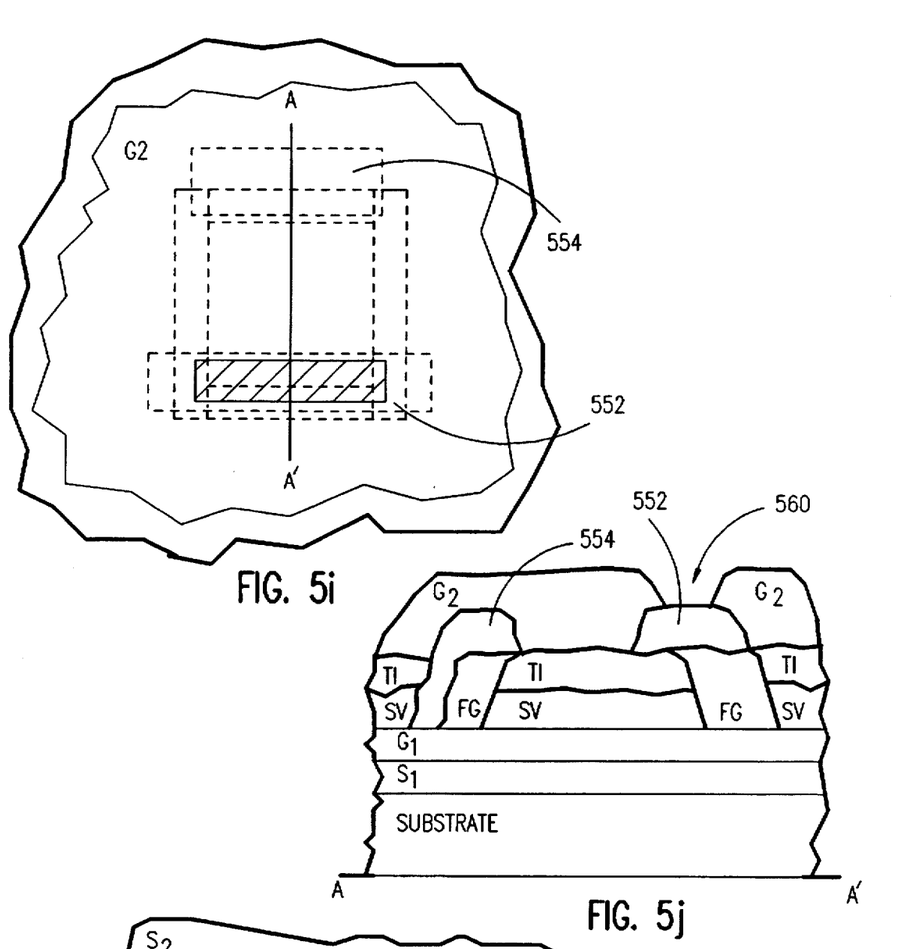
Figure 5K:
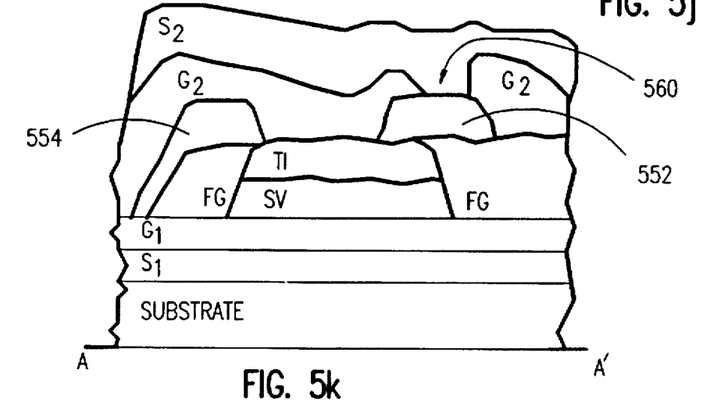

Next, in order to form bottom lead 552 and top lead 554, photoresist material is deposited over surface 530, patterned and developed to define the areas for forming the bottom and top leads. Lead material is then deposited to form the bottom and top leads. The photoresist material is then dissolved with the lead materials above the resist being removed or "liftedoff", leaving lead material only in the predefined areas. FIGS. 5G and 5H show the top view and a cross-section view along the line AA', respectively, at the completion of the above process step. Note that the size and the placement of the bottom lead is no longer a critical processing steps because of the presence of insulating layer 530 between MR sensing element 544 and bottom lead 552 which prevents any electrical contact between the sensing element and the bottom lead.

Next, second gap layer G2 is deposited followed by creating an opening 560, in G2 over bottom lead 552 for connecting bottom lead 552 to a second shield layer S2. FIGS. 5I and 5J show a top view and a cross-section view along the line AA', respectively at the completion of the above process step.

Next, shield S2, as well as write head coils and write pole, are deposited and patterned, using known processing steps to form a complete read/write head. FIG. 5K shows a cross-section along the line AA' of the orthogonal MR sensor of the present invention after the formation of shield S2.

Note that since bottom lead 552 can be made relatively large, opening 560 can be made relatively large which means that a high yield electrical connection can be made between shield S2 and bottom lead 552. A high yield electrical connection between bottom lead 552 and shield S2 ensures that MR sensing element 544, bottom lead 552 and shield S2 are all at the same electrical potential thus eliminating the problems arising from electrical shorting between the sensing element and the shields.

While the present invention has been particularly shown and described with reference to the preferred embodiment thereof, nevertheless, it will be understood by those skilled in the art that various modifications may be made therein without departing from the spirit, scope, and teaching of the present invention. For example, although the preferred embodiment of the present invention was described in terms of an spin valve MR sensor with a series flux guide, the invention is equally applicable to an anisotropic MR sensor having a series flux guide. Also, although in the preferred embodiment of the present invention an insulator layer was used to isolate the sensing element from the bottom lead, the same or a separate insulating layer may also be used to isolate the sensing element from the top lead. Accordingly, it is to be understood that the invention disclosed herein is not to be limited by the illustrated embodiment, but only by the scope of the appended claims.

We claim:

1. An orthogonal magnetoresistive (MR) sensor having an air bearing surface, said orthogonal MR sensor comprising:

an MR sensing element having a bottom portion and a top portion, a first flux guide connected in series to the bottom portion of said MR sensing element, said first flux guide forming a portion of said air bearing surface;

an insulating layer formed over said MR sensing element;

a bottom lead formed over and in physical contact with said first flux guide and said insulating layer;

a second flux guide connected in series to the top portion of said MR sensing element; and a top lead in contact with said second flux guide, said top lead electrically insulated from said magnetoresistive sensing element by said insulating layer.

2. An orthogonal MR sensor according to claim 1, wherein said MR sensor comprises a spin valve MR sensing material.

3. An orthogonal MR sensor according to claim 1, wherein said MR sensor comprises an anisotropic MR sensing material.

4. A magnetic storage system, comprising:

a magnetic storage medium for recording data;

an orthogonal magnetoresistive (MR) sensor for reading said data, said orthogonal MR sensor having an air bearing surface, said MR sensor comprising:

an MR sensing element having a bottom portion and a top portion;

a first flux guide connected in series to the bottom portion of said MR sensing element, said first flux guide forming a portion of said air bearing surface;

an insulating layer formed over said MR sensing element;

a bottom lead formed over and in physical contact with said first flux guide and said insulating layer;

a second flux guide connected in series to the top portion of said MR sensing element; and a top lead in contact with said second flux guide, said top lead electrically insulated from said magnetoresistive sensing element by said insulating layer; and a recording channel coupled to said orthogonal MR sensor for detecting resistance changes in said MR sensing element responsive to applied magnetic fields representative of data bits recorded in said magnetic storage medium.

5. The magnetic storage system according to claim 4, wherein said orthogonal MR sensor comprises a spin valve magnetoresistive sensing material.

6. The magnetic storage system according to claim 4, wherein said magnetoresistive sensor comprises an anisotropic magnetoresistive sensing material.

7. An orthogonal magnetoresistive (MR) sensor having an air bearing surface, said orthogonal MR sensor comprising:

an MR sensing element having a top surface, a bottom portion and a top portion;

a first flux guide connected in series to the bottom portion of said MR sensing element, said first flux guide forming a portion of said air bearing surface;

an insulating layer deposited on the top surface of said MR sensing element, the top surface of said MR sensing element being completely covered by said insulating layer;

a bottom lead formed over and in physical contact with said first flux guide and said insulating layer;

a second flux guide connected in series to the top portion of said MR sensing element; and a top lead in contact with said second flux guide, said top lead electrically insulated from said magnetoresistive sensing element by said insulating layer.

8. An orthogonal MR sensor according to claim 7, wherein said orthogonal MR sensor comprises a spin valve magnetoresistive sensing material.

9. An orthogonal MR sensor according to claim 7, wherein said magnetoresistive sensor comprises an anisotropic magnetoresistive sensing material.

* * * * *